US008547358B2

(12) United States Patent
Homma et al.

(10) Patent No.: US 8,547,358 B2
(45) Date of Patent: Oct. 1, 2013

(54) INFORMATION PROCESSING APPARATUS, INFORMATION PROCESSING METHOD AND PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 960 days.

(21) Appl. No.: 12/637,222

(22) Filed: Dec. 14, 2009

(65) Prior Publication Data

US 2010/0149129 A1 Jun. 17, 2010

(30) Foreign Application Priority Data

Dec. 15, 2008 (JP) ................ P2008-318574

(51) Int. Cl.
*G06F 3/045* (2006.01)
(52) U.S. Cl.
USPC .................... 345/174; 345/173; 345/581
(58) Field of Classification Search
USPC ........... 345/173, 174, 581, 97, 101; 340/638; 702/62
See application file for complete search history.

(56) References Cited

U.S. PATENT DOCUMENTS

| 5,717,421 A * | 2/1998 | Katakura et al. ............. 345/101 |
| 5,754,154 A * | 5/1998 | Katakura et al. ............. 345/97 |
| RE40,891 E * | 9/2009 | Yasutake ....................... 345/173 |
| 2008/0255782 A1* | 10/2008 | Bilac et al. ...................... 702/62 |
| 2009/0140871 A1* | 6/2009 | Titus ............................. 340/638 |
| 2012/0274591 A1* | 11/2012 | Rimas-Ribikauskas et al. ............................ 345/173 |

FOREIGN PATENT DOCUMENTS

| JP | 2001-170358 | 6/2001 |
| JP | 2004-259065 | 9/2004 |

* cited by examiner

*Primary Examiner* — Thuy Pardo
(74) *Attorney, Agent, or Firm* — Sherr & Jiang, PLLC

(57) ABSTRACT

An information processing apparatus is provided which includes a calculation unit that calculates, when state quantities of an object are changed by changing a predetermined parameter specifying a space in which the object is present in accordance with a contact quantity detected by a detection unit, the state quantities of the object after the change based on a dynamic model using the predetermined parameter, physical quantities of the object stored in a storage unit, and the state quantities of the object stored in the storage unit and updates the state quantities of the object stored in the storage unit with the calculated state quantities of the object after the change.

18 Claims, 9 Drawing Sheets

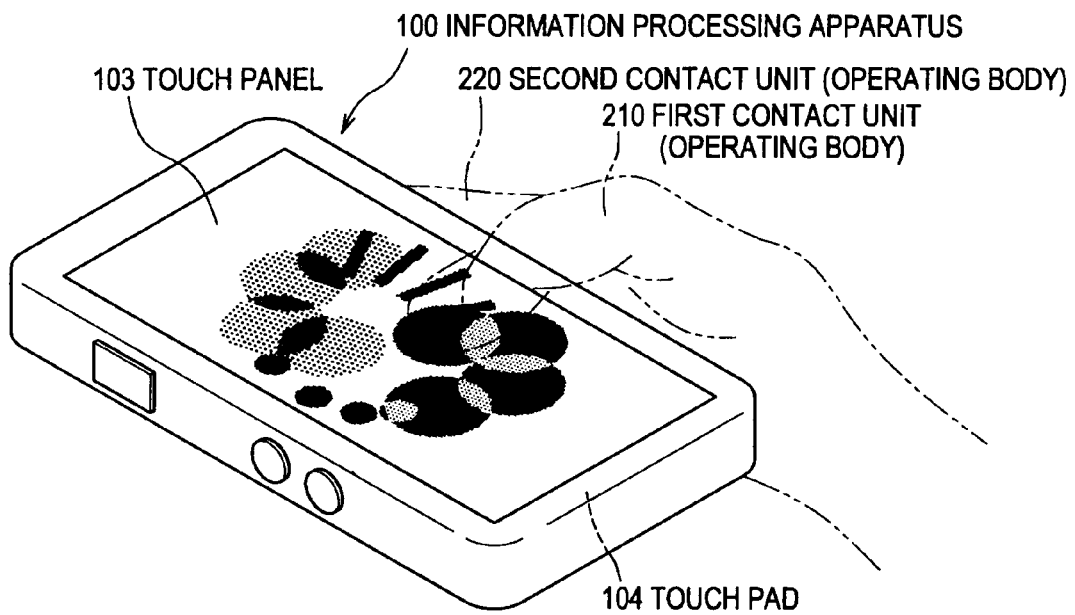
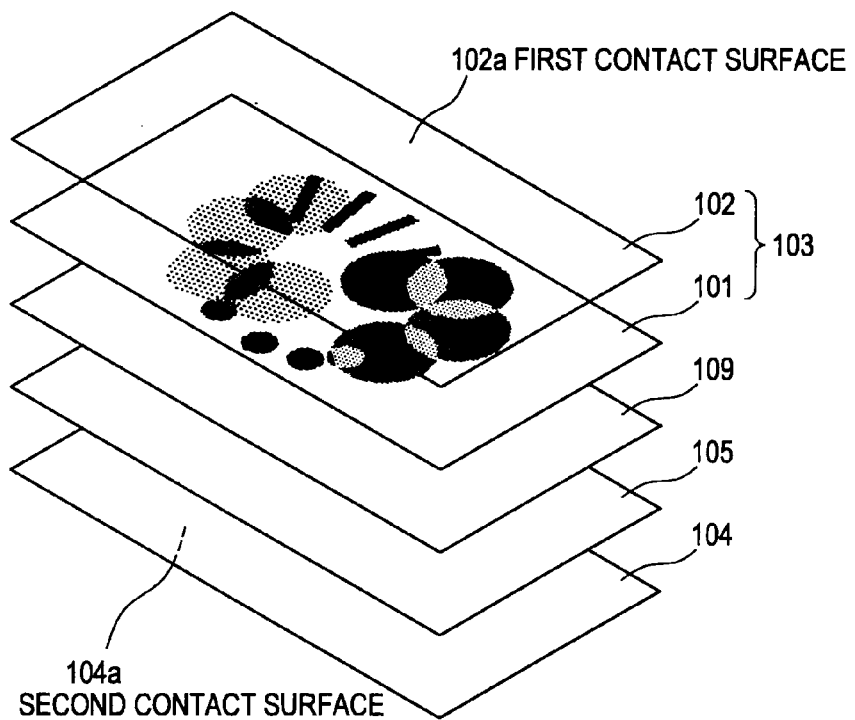

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method, and a program.

2. Description of the Related Art

In recent years, expressions (ambient information) that visualize various kinds of information in everyday life have been widely used (see, for example, "TODAY", [online], [searched on Dec. 1, 2008], Internet<http://today.cada1.net/main.php>). "TODAY", [online], [searched on Dec. 1, 2008], Internet<http://today.cada1.net/main.php> discloses a technology to visualize information such as reception/transmission of a mobile phone.

Also, a technology to visualize news information is disclosed (see, for example, "TODAY", [online], [searched on Dec. 1, 2008], Internet<http://www.bbc.co.uk/white/spectrum.shtml>). According to such expression techniques, there is an advantage that such expressions are useful for learning because items that are not intentionally searched for may be made visible or what is unknown to the user may be discovered.

Further, a technology to determine the rotation axis and rotation direction of an object based on coordinates specified by the user in a screen and rotate the object based on the determined result is disclosed (see Japanese Patent Application Laid-Open No. 2004-259065).

SUMMARY OF THE INVENTION

However, according to the technique of expression disclosed by "TODAY", [online], [searched on Dec. 1, 2008], Internet<http://today.cada1.net/main.php> or "TODAY", [online], [searched on Dec. 1, 2008], Internet<http://www.bbc.co.uk/white/spectrum.shtml>, it may be necessary, for example, to display many objects at a time in the screen. Thus, it becomes necessary for a mobile device in which the screen area is limited to make the size of objects smaller or overlap objects in a depth direction for the display. At this point, it is necessary to secure an adequate area so that the display area of an object to be selected in an operation to select any object displayed in the LCD (Liquid Crystal Display) from a touch panel can be selected by a finger.

In the technique of expression to make the size of objects smaller, for example, a method of switching the zoom ratio correspondingly can be considered. This method has an issue that it is difficult to select objects and take an overall bird's-eye view simultaneously. In the approach of overlapping and displaying objects in the depth direction with the size that adequately secures the selection by a finger, on the other hand, there is an issue that it is difficult to complete an operation in one step when an object hidden behind another object is selected because it is necessary to perform an operation to move the object hiding the other object.

According to the technology disclosed by Japanese Patent Application Laid-Open No. 2004-259065, the rotation axis and rotation direction of an object can be determined based on coordinates specified by the user in the screen so that the object can be rotated based on the determined result. However, there is an issue that how to rotate an object is decided by coordinates specified by the user in the screen and thus, it is difficult for the user to understand a designation method to resolve a state in which an object to be selected is not displayed so that it is difficult to select the object.

The present invention has been made in view of the above issues and it is desirable to provide a novel and improved technology capable of enabling a selection of an object by intuitively changing a state of the object through a contact operation of the user in a state in which an object to be selected is not displayed.

According to an embodiment of the present invention, there is provided an information processing apparatus including a display unit capable of displaying an object, a storage unit that stores physical quantities inherent in the object and state quantities showing a state of the object, a processing unit capable of performing predetermined processing, a detection unit that detects a magnitude of pressure received from an operating body or a degree of proximity of the operating body as a contact quantity, a calculation unit that calculates, when the state quantities of the object are changed by changing a predetermined parameter specifying a space in which the object is present in accordance with the contact quantity detected by the detection unit, the state quantities of the object after the change based on a dynamic model using the predetermined parameter, the physical quantities of the object stored in the storage unit, and the state quantities of the object stored in the storage unit and updates the state quantities of the object stored in the storage unit with the calculated state quantities of the object after the change and a control unit that causes the display unit to display the object based on the state quantities of the object stored in the storage unit and also causes the processing unit to perform predetermined processing in accordance with the state quantities of the object stored in the storage unit.

The object may be constituted by a plurality of divided objects, the storage unit may store a combination of the physical quantities and the state quantities for each divided object, the calculation unit may calculate, when the state quantities of each of the divided objects are changed by changing the predetermined parameter specifying the space in which the object is present in accordance with the contact quantity detected by the detection unit, the state quantities of each of the divided objects after the change based on the dynamic model using the predetermined parameter, the physical quantities of the divided object stored in the storage unit, and the state quantities of the divided object stored in the storage unit and updates the state quantities of each of the divided objects stored in the storage unit with the calculated state quantities of each of the divided objects after the change and the control unit may identify the divided object the display unit is caused to display from among the plurality of divided objects by determining the state quantities of each of the divided objects stored in the storage unit and causes the processing unit to perform predetermined processing in accordance with the identified divided object.

The information processing apparatus may further include an input unit. The control unit may accept input of selection information to select one of a plurality of the identified divided objects via the input unit when the plurality of the identified divided objects is present and may cause the processing unit to perform the predetermined processing in accordance with the divided object selected based on the selection information.

The detection unit may be arranged on a back of the display unit and the calculation unit may change the predetermined parameter by increasing a thickness of a base in a direction of the display unit in accordance with the contact quantity detected by the detection unit when the base having a surface constituted by a plane or a curved surface is arranged between the display unit and the detection unit and the plurality of divided objects is put on the surface of the base.

The calculation unit may change the predetermined parameter, when the detection unit further detects location information indicating a location where the contact quantity is brought into contact by the operating body, by increasing the thickness of the base in the direction of the display unit in accordance with the contact quantity for each location indicated by the location information.

The physical quantities of each of the divided objects stored in the storage unit may include a mass of each of the divided objects and the state quantities of each of the divided objects stored in the storage unit may include position information including a height of each of the divided objects using the surface of the base as a reference.

The calculation unit may determine, when the predetermined parameter is changed by increasing the thickness of the base, whether the height indicated by the position information of each of the divided objects remains less than a threshold stored in the storage unit and calculates, for the divided objects whose height is determined to remain less than the threshold, the state quantities of the objects after the change by adding an increase in the thickness of the base to the height included in the position information before the change.

The object may be constituted by being surrounded by a plurality of surfaces and the control unit may identify the surface of the plurality of surfaces on which the display unit is caused to make a display by determining the state quantities of the object stored in the storage unit and may cause the processing unit to perform the predetermined processing in accordance with the identified surface.

The information processing apparatus may further include an input unit. The control unit may accept input of selection information to select one of a plurality of the identified surfaces via the input unit when the plurality of the identified surfaces is present and may cause the processing unit to perform the predetermined processing in accordance with the surface selected based on the selection information.

The detection unit may be arranged on a back of the display unit and the calculation unit may change the predetermined parameter by increasing a thickness of a base in a direction of the display unit in accordance with the contact quantity detected by the detection unit when the base having a surface constituted by a plane or a curved surface is arranged between the display unit and the detection unit and the object is put on the surface of the base.

The calculation unit may change the predetermined parameter, when the detection unit further detects location information indicating a location where the contact quantity is brought into contact by the operating body, by increasing the thickness of the base in the direction of the display unit in accordance with the contact quantity for each location indicated by the location information.

The physical quantities of the object stored in the storage unit may include a mass of each of the object and the state quantities of the object stored in the storage unit may include position information including a height of the object using the surface of the base as a reference.

According to the present invention, as described above, a technology capable of enabling a selection of an object by intuitively changing a state of the object through a contact operation of the user in a state in which an object to be selected is not displayed can be provided.

BRIEF DESCRIPTION OF THE DRAWINGS

FIG. 1 is a diagram showing a usage example of an information processing apparatus according to a first embodiment of the present invention;

FIG. 2 is an exploded perspective view showing a hardware configuration of the information processing apparatus according to the first embodiment of the present invention;

DETAILED DESCRIPTION OF THE EMBODIMENTS

Figure 3:
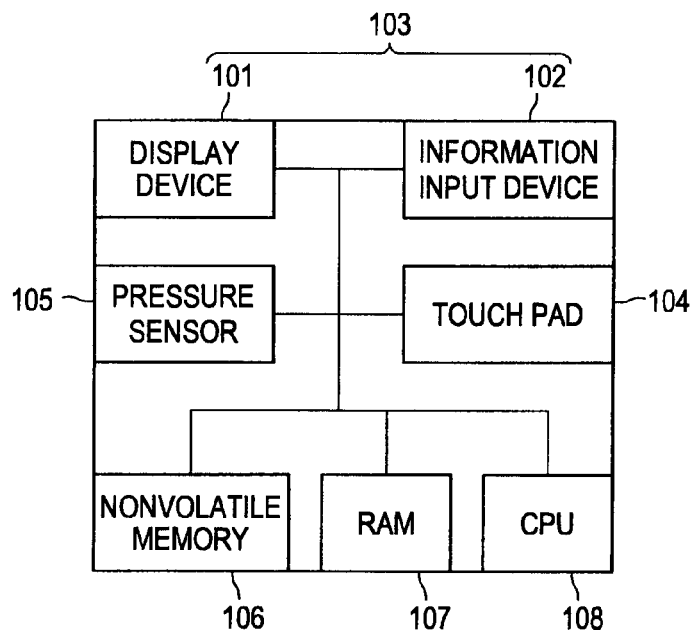
FIG. 3 is a block diagram showing the hardware configuration of the information processing apparatus according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description is provided in the order shown below:

1. First Embodiment
   1-1. Usage Example of Information Processing Apparatus
   1-2. Hardware Configuration of Information Processing Apparatus
   1-3. Function of Information Processing Apparatus
   1-4. Operation of Information Processing Apparatus
2. Modification of First Embodiment
   2-1. Function of Information Processing Apparatus
3. Summary 1. First Embodiment First, the first embodiment of the present invention will be described.

[1-1. Usage Example of Information Processing Apparatus]

First, a usage example of an information processing apparatus according to the first embodiment of the present invention will be described. FIG. 1 is a diagram showing a usage example of an information processing apparatus according to the first embodiment of the present invention. A usage example of the information processing apparatus according to the first embodiment of the present invention will be described using FIG. 1.

In the present embodiment of the present invention, an information processing apparatus 100 (such as a mobile device) provided with a touch panel 103 on the front side and a touch pad 104 in the rear side will be described. The user makes a selection from objects displayed in the touch panel 103. For example, the user uses a first contact unit 210 (operating body) for a tap operation on the front side and a second contact unit 220 (operating body) for a tap operation on the rear side.

It is assumed below that the thumb of the right hand of the user is used as the first contact unit 210 and the forefinger of the right hand of the user as the second contact unit 220, but the contact units are not limited to these fingers, and fingers that are easier for the user to use may be used. For example, fingers of the left hand may be used or other fingers (such as the middle finger, fourth finger and little finger) may be used. Moreover, the first contact unit 210 and the second contact unit 220 may be the same finger or different fingers.

In the foregoing, a usage example of the information processing apparatus 100 according to the first embodiment of the present invention has been described. Next, the hardware configuration of the information processing apparatus 100 according to the first embodiment of the present invention will be described.

[1-2. Hardware Configuration of Information Processing Apparatus]

Next, the hardware configuration of an information processing apparatus according to the first embodiment of the present invention will be described. FIG. 2 is an exploded perspective view showing the hardware configuration of an information processing apparatus according to the first embodiment of the present invention. The hardware configuration of the information processing apparatus according to the first embodiment of the present invention will be described below using FIG. 2 (FIG. 1 is also referenced when appropriate).

As shown in FIG. 2, an information input device 102 is placed on the top surface of the information processing apparatus 100. The information input device 102 has a first contact surface 102a capable of coming into contact with the first contact unit 210 of the user and can acquire first position information indicating the contact position of the first contact surface 102a with the first contact unit 210. The information input device 102 outputs the acquired first position information to a CPU 108 as an information signal. The user of the information processing apparatus 100 can input various kinds of data into the information processing apparatus 100 or provide instructions of processing operation by operating the information input device 102. The information input device 102 forms a portion of the touch panel 103.

A display device 101 is placed below the information input apparatus 102. The display device 101 is enabled to display information. The display device 101 forms a portion of the touch panel 103. The display device 101 is configured of an apparatus capable of visually notifying the user of information such as an LCD (Liquid Crystal Display) and organic EL (Electroluminescence) display device. The display device 101 outputs, for example, results obtained by various kinds of processing performed by the information processing apparatus 100. More specifically, the display device 101 displays results obtained by various kinds of processing performed by the information processing apparatus 100 by text or images.

A base 109 is placed below the display device 101. Various components or devices used by the information processing apparatus 100 are mounted on the base 109. More specifically, devices such as a non-volatile memory 106, a RAM (Random Access Memory) 107, a CPU (Central Processing Unit) 108 and the like described using FIG. 3 later are mounted.

The touch pad 104 is arranged on the undersurface of the information processing apparatus 100. The touch pad 104 has a second contact surface 104a capable of coming into contact with the second contact unit 220 of the user and can acquire second position information indicating the contact position of the second contact surface 104a with the second contact unit 220. The touch pad 104 outputs the acquired second position information to the CPU 108 as an information signal. The touch pad 104 is formed of a resistance film method using metallic thin films forming transparent electrodes, electrostatic capacity method that detects the position by capturing a change in electrostatic capacity between a fingertip and a conductive film, infrared ray blocking method, or electromagnetic induction method that is capable of detecting position information of the second contact unit 220.

A pressure sensor 105 is arranged on the top surface of the touch pad 104. The pressure sensor 105 may be arranged, as shown in FIG. 2, over the entire top surface of the touch pad 104 or set up at predetermined locations (for example, four corners), but the location where the pressure sensor 105 is arranged is not specifically limited. The pressure sensor 105 may be arranged at any location where pressure received by the second contact surface 104a from the second contact unit 220 can be detected when the user presses the touch pad 104 through the second contact unit 220.

FIG. 3 is a block diagram showing the hardware configuration of the information processing apparatus according to the first embodiment of the present invention. The hardware configuration of the information processing apparatus according to the first embodiment of the present invention will be described below using FIG. 3 (FIG. 1 and FIG. 2 are also referenced when appropriate).

As shown in FIG. 3, the information processing apparatus 100 according to the present embodiment of the present invention includes the touch panel 103 (the display device 101 and the information input device 102), the touch pad 104, the pressure sensor 105, the nonvolatile memory 106, the RAM 107, and the CPU 108.

As described above, the pressure sensor 105 is capable of detecting pressure received by the second contact surface 104a from the second contact unit 220 and the type thereof is not specifically limited.

The non-volatile memory (storage unit) 106 is a data storage device formed as an example of the storage unit of the information processing apparatus 100 and is constituted by, for example, a magnetic storage device such as an HDD (Hard Disk Drive), semiconductor storage device, optical storage device, or magneto-optical storage device. The non-volatile memory 106 stores programs executed by the CPU 108 and various kinds of data. In the present embodiment, a column kana character group and a first row kana character are associated before being stored in the non-volatile memory 106.

The RAM 107 temporarily stores programs used by the CPU 108 and parameters that appropriately change during execution thereof.

The CPU 108 functions as an arithmetic processing unit and a control apparatus and controls the overall operation inside the information processing apparatus 100 or a portion thereof according to various programs recorded in the non-volatile memory 106 or the RAM 107.

In the foregoing, an example of the hardware configuration that can realize the function of the information processing apparatus 100 according to the present embodiment of the present invention has been shown. Each of the above components may be constituted using general-purpose members or hardware specialized for the function of each component. Therefore, the hardware configuration to be used can be changed appropriately in accordance with the technical level at a time when the present embodiment is carried out.

In the foregoing, the hardware configuration of the information processing apparatus 100 according to the present embodiment of the present invention has been described. Next, the function of the information processing apparatus 100 according to the present embodiment of the present invention will be described.

[1-3. Function of Information Processing Apparatus]

Figure 4:
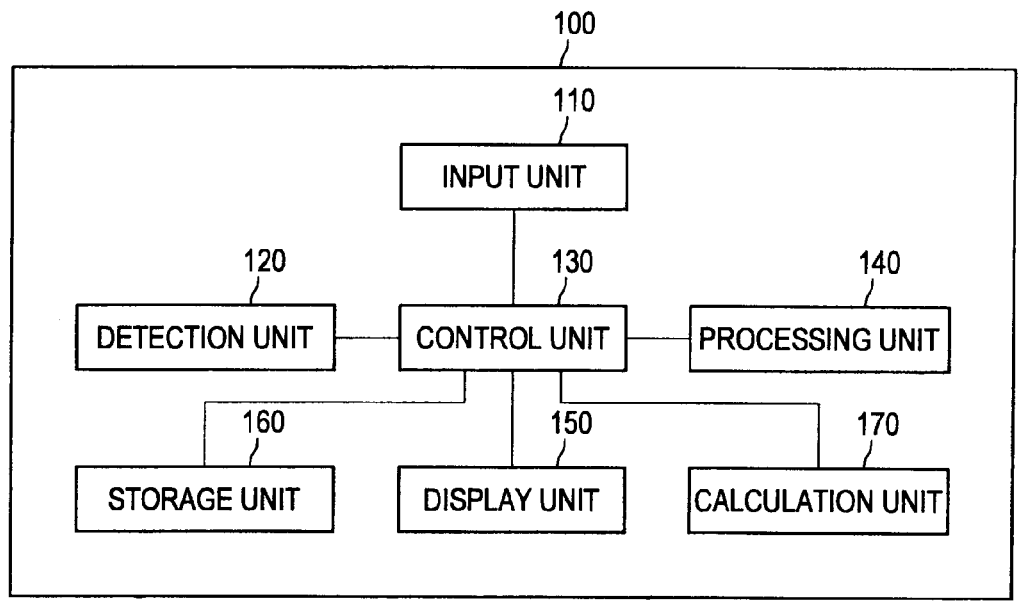
FIG. 4 is a functional block diagram of the information processing apparatus according to the first embodiment of the present invention.

FIG. 4 is a functional block diagram of the information processing apparatus according to the first embodiment of the present invention. The function of the information processing apparatus according to the first embodiment of the present invention will be described below using FIG. 4 (FIG. 1 to FIG. 3 are also referenced when appropriate).

As shown in FIG. 4, the information processing apparatus 100 according to the first embodiment includes the touch panel 103, an input unit 110, a detection unit 120, a control unit 130, a processing unit 140, a display unit 150, a storage unit 160, and a calculation unit 170. Each of these blocks will be described later with reference to FIG. 6 to FIG. 9.

FIG. 5 is an explanatory view illustrating acquisition of position information by using an electrostatic touch pad. Acquisition of position information by using an electrostatic touch pad will be described below using FIG. 5 (FIG. 1 to FIG. 4 are also referenced when appropriate).

Figure 5A:
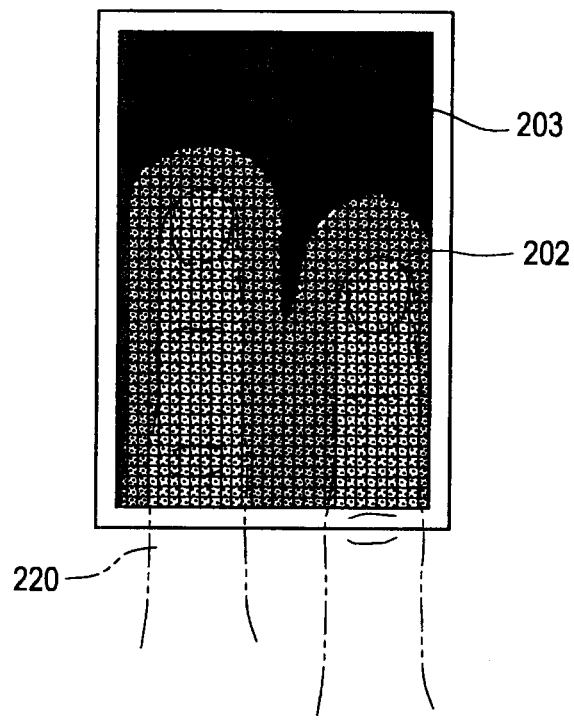
FIG. 5 (5A-5B) is an explanatory view illustrating acquisition of position information by using an electrostatic touch pad.

In the present embodiment, particularly the method of detecting the degree of proximity of the second contact unit 220 to the second contact surface 104a using an electrostatic touch pad as the touch pad 104 as a contact amount will be described. As shown in FIG. 5A, the electrostatic touch pad has electrostatic sensors arranged like a grid (for example, 10×7) and changes the value of electrostatic sensor depending on a change in electrostatic capacity.

When the second contact unit 220 comes closer to or comes into contact with an electrostatic sensor of the electrostatic touch pad, the electrostatic capacity of the electrostatic sensor increases. An interaction such as tapping is generally carried out based on a change of the increase. Moreover, electrostatic capacities of individual electrostatic sensors can simultaneously be acquired. In such a case, changes in electrostatic capacity of all electrostatic sensors of the electrostatic touch pad can simultaneously be detected so that the shape of a finger coming closer or coming into contact can be detected by interpolation.

A state where the shape of a finger coming closer or coming into contact is detected in the electrostatic touch pad will be described with reference to FIG. 5A. In FIG. 5A, a region where the electrostatic capacity of electrostatic sensors increases is denoted by a region 202 and a region where the electrostatic capacity of electrostatic sensors does not change is denoted by a region 203. When the second contact unit 220 is coming closer or coming into contact, the electrostatic capacity of electrostatic sensors changes. Therefore, as shown in FIG. 5A, the shape of the region 202 changes along the shape of the second contact unit 220 so that the shape of the second contact unit 220 can be detected.

Figure 5B:
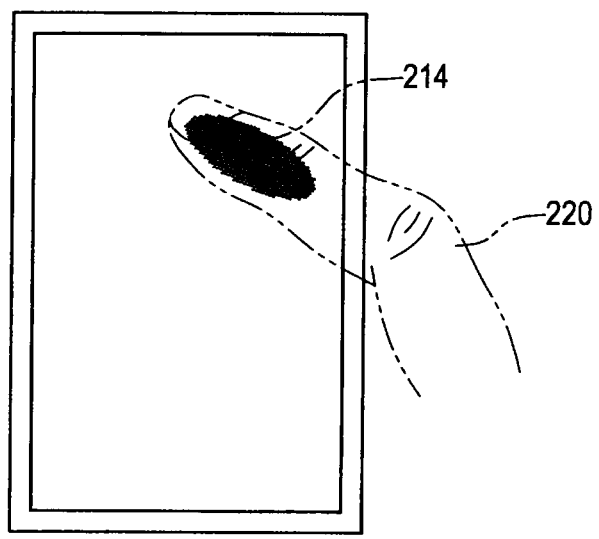

Thus, the shape or orientation of the second contact unit 220 can be detected through a change in electrostatic capacity by using the electrostatic touch pad. As shown in FIG. 5B, when the user causes the second contact unit 220 to come closer or come into contact with the electrostatic touch pad, the electrostatic capacity of a region 214 changes so that the shape of the second contact unit 220 can be detected.

FIG. 6 is an explanatory view (Part 1) illustrating the function of the information processing apparatus according to the first embodiment of the present invention. FIG. 7 is an explanatory view (Part 2) illustrating the function of the information processing apparatus according to the first embodiment of the present invention. FIG. 8 is an explanatory view (Part 3) illustrating the function of the information processing apparatus according to the first embodiment of the present invention. FIG. 9 is an explanatory view (Part 4) illustrating the function of the information processing apparatus according to the first embodiment of the present invention. The function of the information processing apparatus according to the first embodiment of the present invention will be described below using FIG. 6 to FIG. 9 (FIG. 1 to FIG. 5 are also referenced when appropriate).

Figure 6A:
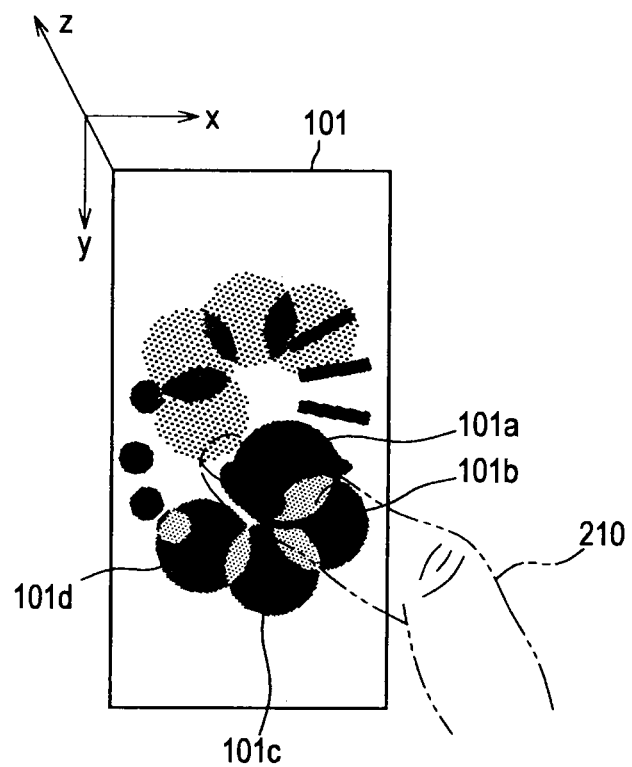
FIG. 6 (6A-6B) is an explanatory view (Part 1) illustrating a function of the information processing apparatus according to the first embodiment of the present invention.
Figure 7:
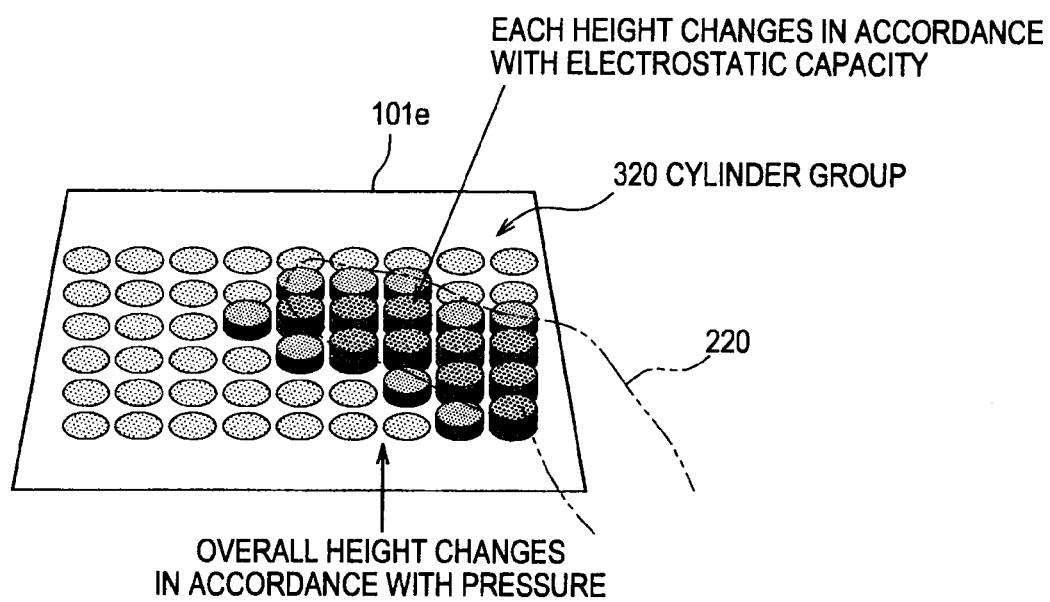
FIG. 7 is an explanatory view (Part 2) illustrating the function of the information processing apparatus according to the first embodiment of the present invention.

FIG. 6A shows objects displayed in the display unit 150. In the example shown in FIG. 6A, a plurality of divided objects 101a, 101b, 101c, and 101d is displayed as examples of objects. Thus, the display unit 150 can display objects (for example, the divided objects 101a, 101b, 101c, and 101d).

The user can select one of the divided objects 101a, 101b, 101c, and 101d by the first contact unit 210 on the touch panel 103. However, as shown in FIG. 6A, it may be difficult to make a selection because the divided objects 101a, 101b, 101c, and 101d are overlapped.

Figure 6B:
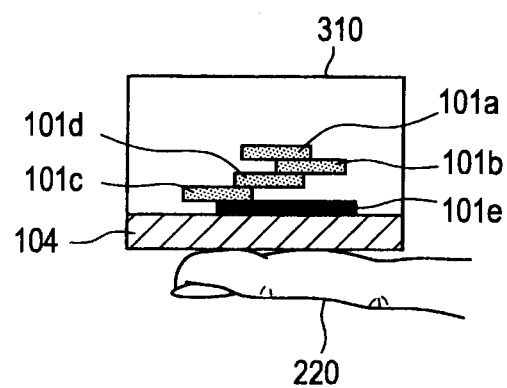

FIG. 6B is a diagram of a three-dimensional virtual space 310 in which the presence of objects displayed in the display unit 150 is assumed when viewed from the side. A base 101e is a ground whose thickness (height) is uniquely determined based on an electrostatic capacity change distribution detected by the touch pad 104 or pressure detected by the pressure sensor 105.

As shown in FIG. 7, when the pressure sensor 105 detects pressure from the second contact unit 220, the thickness (height) of the base 101e increases in proportion to the magnitude of the detected pressure. If the touch pad 104 detects an increase in contact area with the second contact unit 220, the number of cylinder groups 320 increases. When the electrostatic capacity of the touch pad 104 changes, the thickness (height) of individual cylinders becomes relatively higher with an increasing amount of change. Incidentally, the number of cylinders is in proportion to the number of electrostatic sensors of the electrostatic touch pad (the touch pad 104) so that subdivision of cylinders proceeds with an increasing number of sensors, leading to an expression closer to the shape of a finger.

Figure 8A:
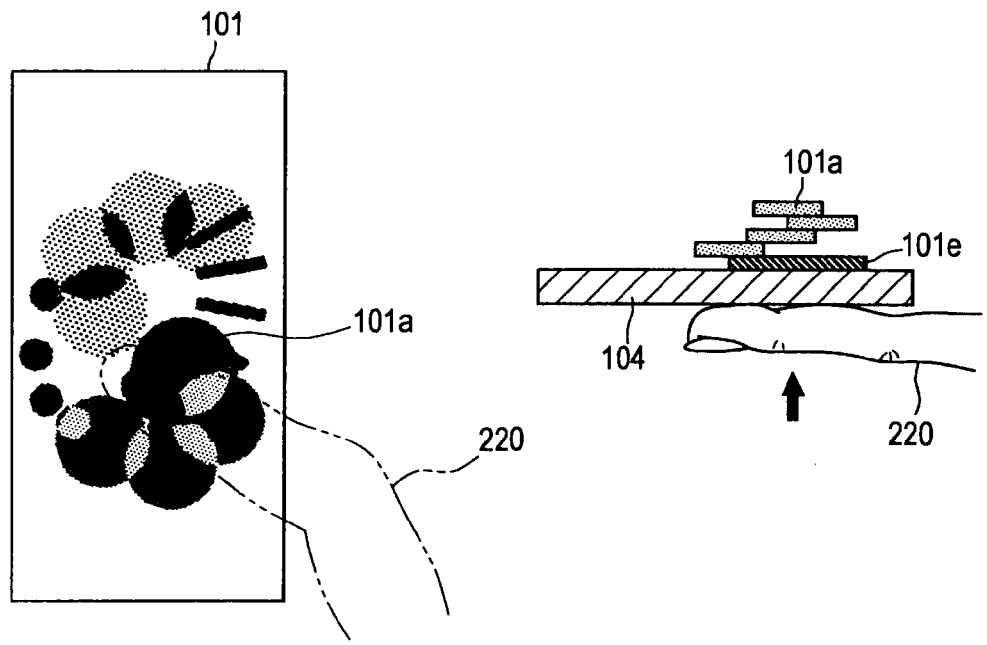
FIG. 8 (8A-8B) is an explanatory view (Part 3) illustrating the function of the information processing apparatus according to the first embodiment of the present invention.

FIG. 8A shows a state in which the divided object 101a is put on top of other divided objects. The left diagram in FIG. 8A shows a display example when the state is displayed in the display unit 150 and the right diagram in FIG. 8A shows a diagram when the state is viewed from the side.

The input unit 110 accepts input of information. The input unit 110 is constituted by, for example, the information input device 102 of the touch panel 103.

The storage unit 160 stores physical quantities specific to objects (for example, the divided objects 101a, 101b, 101c, and 101d) and state quantities showing states of the objects. As physical quantities specific to an object, for example, the mass, shape, coefficient of static friction, coefficient of dynamic friction, coefficient of restitution and the like of the object can be assumed. As state quantities showing the state of an object, for example, the position and the like of the object can be assumed.

The processing unit 140 is capable of performing predetermined processing. The predetermined processing may be any processing and is not specifically limited and, for example, processing to download information on the Internet and processing to reproduce music content data can be assumed.

The detection unit 120 detects the magnitude of pressure received from the second contact unit 220 or the degree of proximity of the second contact unit 220 as a contact quantity. The detection unit 120 is capable of detecting the magnitude of pressure received from the second contact unit 220 by, for example, the pressure sensor 150 described above as a contact quantity. Moreover, the detection unit 120 is capable of detecting the degree of proximity of the second contact unit 220 by, for example, the touch pad 104 as a contact quantity.

The calculation unit 170 changes a predetermined parameter that specifies the space (the three-dimensional virtual space 310) in which objects (for example, the divided objects 101a, 101b, 101c, and 101d) are present in accordance with the contact quantity detected by the detection unit 120. Then, when any state quantity of an object is changed, the calculation unit 170 calculates the state quantities of the object after the change based on a dynamic model using the predetermined parameter, physical quantities of the object stored in the storage unit 160, and state quantities of the object stored in the storage unit 160. In the above example, the predetermined parameter corresponds to the thickness (height) of the base 101e. In the calculation based on the dynamic model, the position or orientation of an object in the three-dimensional virtual space is uniquely determined based on the aforementioned physical quantities, state quantities, predetermined parameter and the like of the object. The calculation unit 170 updates the state quantities of the object stored in the storage unit 160 with the calculated state quantities of the object after the change.

The control unit 130 causes the display unit 150 to display an object based on the state quantities of the object stored in the storage unit 160 and also causes the processing unit 140 to perform predetermined processing in accordance with the state quantities of the object stored in the storage unit 160.

As shown in FIG. 8A, an object may be constituted by a plurality of divided objects (for example, the divided objects 101a, 101b, 101c, and 101d) after being divided. In that case, the storage unit 160 stores a combination of the physical quantities and state quantities for each divided object. The calculation unit 170 changes the predetermined parameter that specifies the space (the three-dimensional virtual space 310) in which the plurality of divided objects is present in accordance with the contact quantity detected by the detection unit 120. Then, when any state quantity of each divided object is changed, the calculation unit 170 calculates the state quantities of each divided object after the change based on the dynamic model using the predetermined parameter, physical quantities of the divided object stored in the storage unit 160, and state quantities of the divided object stored in the storage unit 160. The calculation unit 170 updates the state quantities of each divided object stored in the storage unit 160 with the calculated state quantities of each divided object after the change.

If an object is constituted by being divided into a plurality of divided objects, the control unit 130 determines the state quantities of each divided object stored in the storage unit 160. The control unit 130 thereby specifies a divided object of the plurality of divided objects the display unit 150 is caused to display and then causes the processing unit 140 to perform processing in accordance with the specified divided object. For example, if there is any divided object a portion or the whole of which is hidden by other divided objects, the control unit 130 determines that the hidden divided object is not displayed in the display unit 150.

If there is a plurality of specified divided objects, the control unit 130 may accept input of selection information to select one of the plurality of specified divided objects via the input unit 110. In that case, the processing unit 140 may be caused to perform predetermined processing in accordance with the divided object selected based on the selection information.

The detection unit 120 may be arranged on the back of the display unit 150. In that case, the calculation unit 170 may assume that the base 101e having a surface constituted by a plane or a curved surface is arranged between the display unit 150 and the detection unit 120. Also in that case, the calculation unit 170 may assume that a plurality of divided objects (for example, the divided objects 101a, 101b, 101c, and 101d) is put on the surface of the base 101e. In that case, the calculation unit 170 may change the predetermined parameter by increasing the thickness of the base 101e in the direction of the display unit 150 in accordance with the contact quantity detected by the detection unit 120.

If the detection unit 120 further detects location information indicating the location where a contact quantity is brought into contact by the second contact unit 220, the calculation unit 170 may increase the thickness of the base 101e in the direction of the display unit 150 in accordance with the contact quantity for each location indicated by the location information. The calculation unit 170 may change the predetermined parameter in this manner.

Physical quantities of each divided object stored by the storage unit 160 may include the mass of each divided object, and state quantities of each divided object stored by the storage unit 160 may include position information including the height using the surface of the base 101e of each divided object as a reference.

Figure 8B:
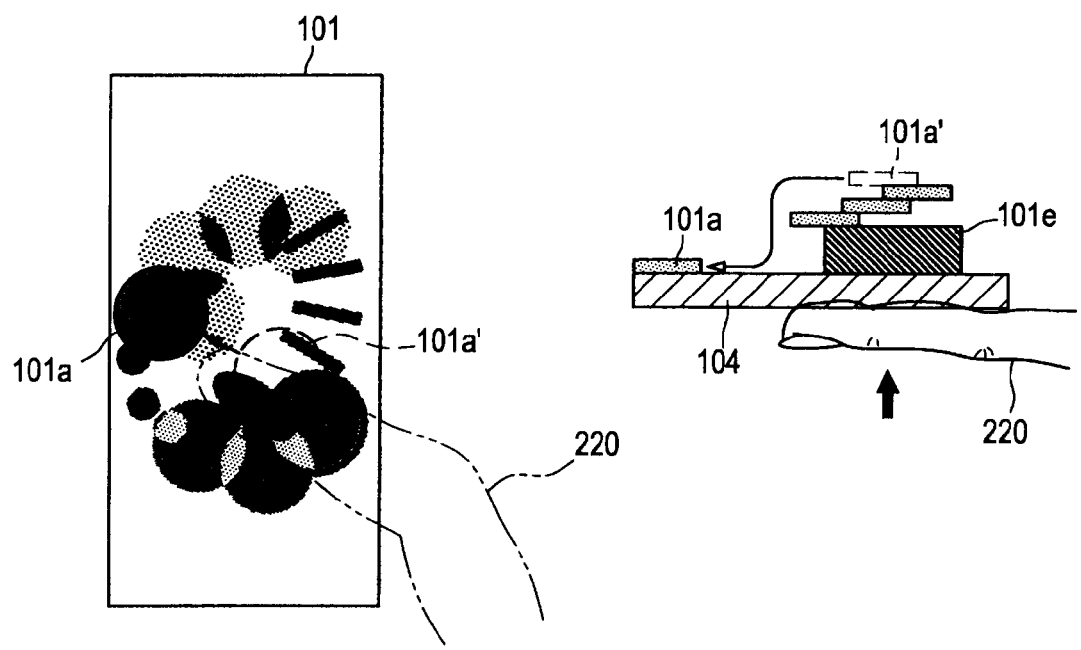

When the predetermined parameter is changed by increasing the thickness of the base 101e, the calculation unit 170 may determine whether the height indicated by position information of each divided object is less than the threshold stored in the storage unit 160. In that case, for divided objects determined to have the height less than the threshold, the calculation unit 170 may calculate state quantities after the change by adding an increase in thickness of the base 101e to the height included in position information before the change. Assume, for example, that after the predetermined parameter being changed in this manner, the calculation unit 170 determines that the height indicated by position information of only the divided object 101a becomes equal to or more than the threshold, while the heights indicated by position information of the other divided objects 101b, 101c, and 101d remain less than the threshold. In that case, divided objects as shown in FIG. 8B are displayed in the display unit 150. More specifically, the calculation unit 170 performs calculations based on the dynamic model only for the divided object 101a, which are based on position information indicating the position of a divided object 101a', to acquire position information indicating the position of the divided object 101a as a calculation result.

Figure 9A:
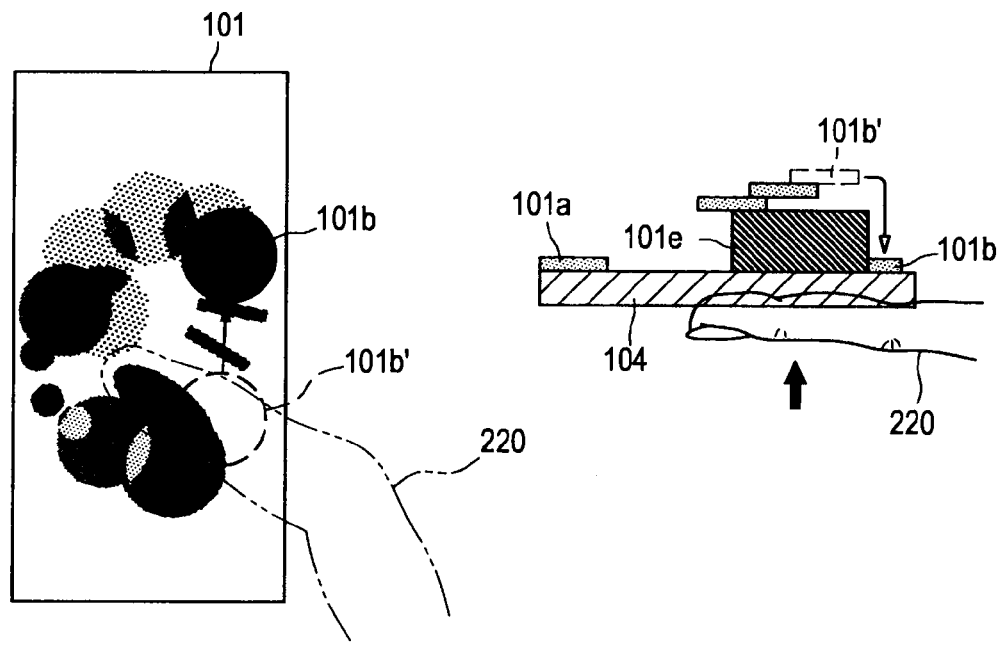
FIG. 9 (9A-9B) is an explanatory view (Part 4) illustrating the function of the information processing apparatus according to the first embodiment of the present invention.

The example shown in FIG. 9A shows a case in which the second contact unit 220 further pushes up the touch pad 104. Assume, for example, that the calculation unit 170 determines that the height indicated by position information of only the divided object 101b becomes equal to or more than the threshold, while the heights indicated by position information of the other divided objects 101a, 101c, and 101d remain less than the threshold. In this case, the calculation unit 170 performs calculations based on the dynamic model only for the divided object 101b, which are based on position information indicating the position of a divided object 101b', to acquire position information indicating the position of the divided object 101*b* as a calculation result.

Figure 9B:
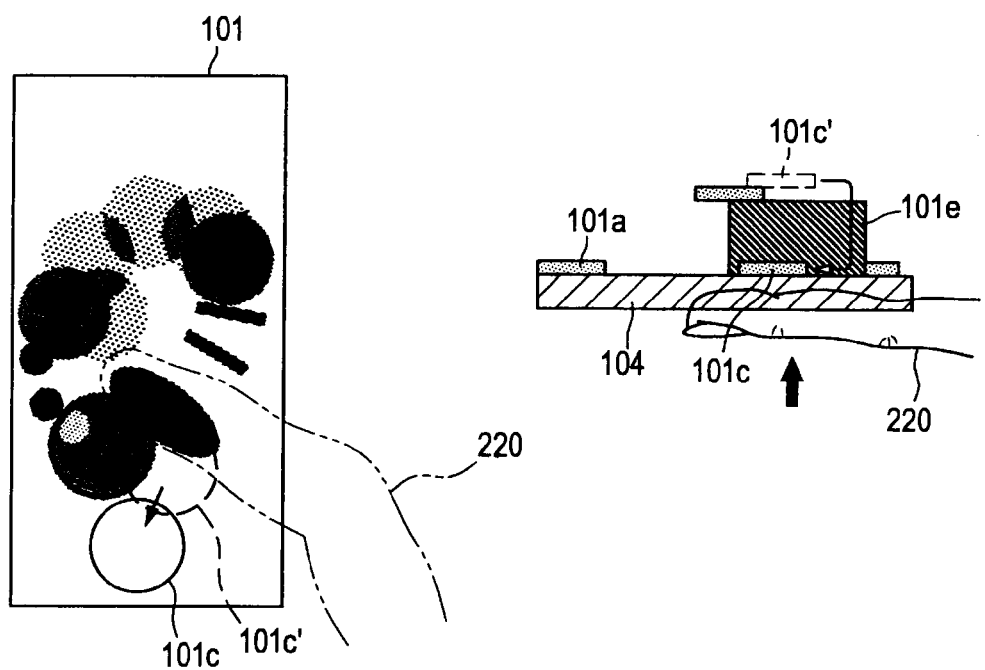

Similarly, the example shown in FIG. 9B shows a case in which the second contact unit 220 further pushes up the touch pad 104. Assume, for example, that the calculation unit 170 determines that the height indicated by position information of only the divided object 101*c* becomes equal to or more than the threshold, while the heights indicated by position information of the other divided objects 101*a*, 101*b*, and 101*d* remain less than the threshold. In this case, the calculation unit 170 performs calculations based on the dynamic model only for the divided object 101*c*, which are based on position information indicating the position of a divided object 101*c'*, to acquire position information indicating the position of the divided object 101*c* as a calculation result.

[1-4. Operation of Information Processing Apparatus]

Figure 10:
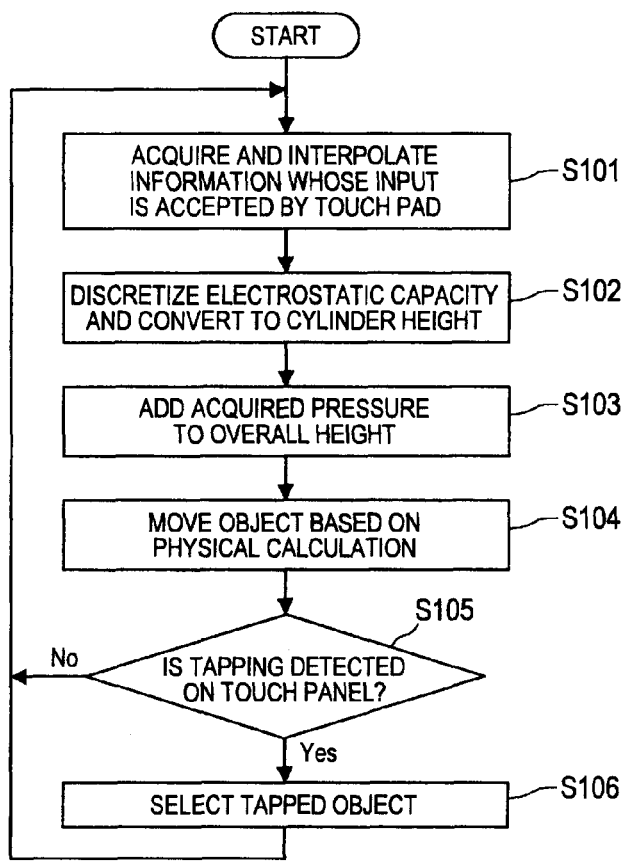
FIG. 10 is a flow chart showing an operation of the information processing apparatus according to the first embodiment of the present invention.

FIG. 10 is a flow chart showing an operation of the information processing apparatus according to the first embodiment of the present invention. The operation of the information processing apparatus according to the first embodiment of the present invention will be described below using FIG. 10 (FIG. 1 to FIG. 9 are also referenced when appropriate).

First, the information processing apparatus 100 generates a thread that continues to monitor for changes of electrostatic capacity of the touch pad 104 (electrostatic touch pad) when an application is activated. The information processing apparatus 100 acquires therein the electrostatic capacity of each sensor of an electrostatic touch pad. Then, the information processing apparatus 100 calculates a difference between the acquired electrostatic capacity and the electrostatic capacity when the application is activated for interpolation in any resolution (step S101). Next, the information processing apparatus 100 discretizes the calculated change in electrostatic capacity at any intervals for conversion into the height of cylinders spread all over the screen (step S102). For example, the height 0 is set for cylinders whose electrostatic capacity has not changed. Next, the information processing apparatus 100 discretizes information of pressure pressing against the backside acquired by the pressure sensor 105 in any range for addition to the overall height of cylinders (step S103). With the above steps, the overall height of cylinders is uniquely calculated.

Next, the information processing apparatus 100 rewrites the height of the cylinder group 320 arranged on the wall surface (z=0) deepest in the three-dimensional virtual space 310 by the calculated height of the cylinder group 320. At this point, the information processing apparatus 100 fixes objects arranged on cylinders whose height is equal to or more than a certain value (for example, z>0) onto the cylinders and releases fixation in accordance with the height of cylinder to move such objects to any position based on physical calculation (step S104).

A screen display example when a finger is in a proximity state in which the finger is not in contact with the backside touch pad 104 is shown (see FIG. 8A). An electrostatic touch pad detects a change in electrostatic capacity and thus, a finger can be detected from a certain distance even without contact. In this case, the height of cylinder groups (see FIG. 7, illustrated in the shape of a finger for simplification) is approximately close to 0 and objects put on the base 101*e* are assumed to be in a state of rest.

A screen display example in a state in which the finger is in contact with the backside touch pad 104 is shown (see FIG. 8B). In this case, only the divided object 101*a* positioned on the top of the base 101*e* is released from the state of rest and moves by physical motion. At this point, the movement occurs from the base 101*e* with a height toward an area without height.

A screen display example in a state in which the finger comes into contact with the backside touch pad 104 and exerts a certain level of pressure is shown (see FIG. 9A). In this case, like the divided object 101*a*, only the divided object 101*b* positioned on the top of the base 101*e* is released from the state of rest and moves toward an area without height.

A screen display example when higher pressure is exerted on the backside touch pad 104 than in the case shown in FIG. 9A is shown (see FIG. 9B). Here, the divided object 101*c* is released from the state of rest and moves toward an area without height. Now, only the divided object 101*d* retains the state of rest.

If tapping is detected from the front side in any timing ("Yes" at step S105), the tapped object is set to a selected state (step S106). As shown in FIG. 8 and FIG. 9, a physical external force is applied to the three-dimensional virtual space 310 by the way in which the finger is pressed and the shape thereof and the state of rest (nullification of physical motion) of objects is released from the order arranged on the top. Accordingly, objects overlapped in the depth direction can intuitively be moved to the front, making a selection in the touch panel 103 on the front side easier.

2. Modification of First Embodiment

First, a modification of the first embodiment of the present invention will be described.

[2-1. Function of Information Processing Apparatus]

FIG. 11 is an explanatory view illustrating the function of the information processing apparatus according to a modification of the first embodiment of the present invention. The function of the information processing apparatus according to a modification of the first embodiment of the present invention will be described below using FIG. 11 (FIG. 1 to FIG. 10 are also referenced when appropriate).

Figure 11A:
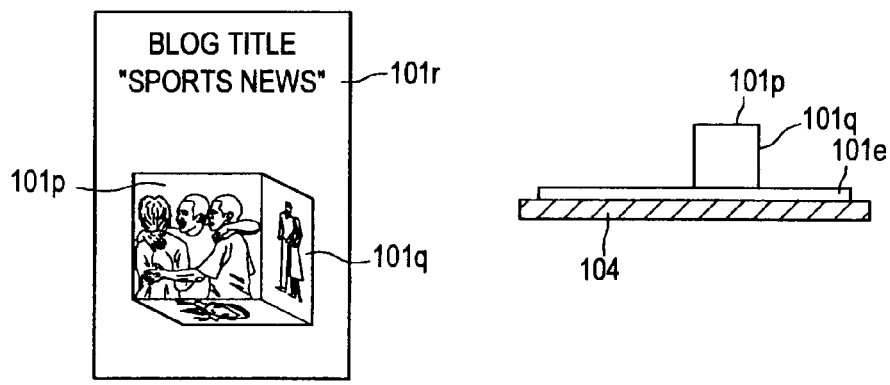
FIG. 11 (11A-11B) is an explanatory view illustrating the function of the information processing apparatus according to a modification of the first embodiment of the present invention.
Figure 11B:
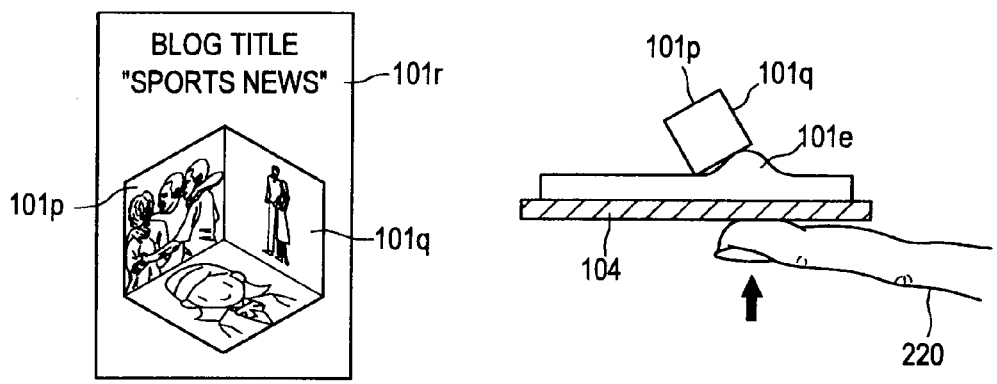

An object may be constituted by being surrounded by a plurality of surfaces 101*p*, 101*q* and the like. The left diagram in FIG. 11A shows a display example when a state in which the surface 101*p* is present in the top surface is displayed in the display unit 150. The right diagram in FIG. 11B shows a diagram when the state is viewed from the side. The control unit 130 identifies the surface the display unit 150 is caused to display from among the plurality of surfaces 101*p*, 101*q* and the like by determining the state quantities of the object stored in the storage unit 160. In the example shown in FIG. 11A, the control unit 130 causes the processing unit 140 to perform processing (processing to download information of a blog whose blog title is "Sports News") in accordance with the surface 101*p*.

If there is a plurality of identified surfaces, the control unit 130 may accept input of selection information to select one of the plurality of identified surfaces via the input unit 110 and to cause the processing unit 140 to perform predetermined processing in accordance with the surface selected based on the selection information.

Moreover, as described in the first embodiment, the detection unit 120 may be arranged on the back of the display unit 150 and the base 101*e* having a surface constituted by a plane or a curved surface may be arranged between the display unit 150 and the detection unit 120. If objects are put on the surface of the base 101*e*, the calculation unit 170 may change the predetermined parameter by increasing the thickness of the base 101e in the direction of the display unit 150 in accordance with the contact quantity detected by the detection unit 120.

If the detection unit 120 further detects location information indicating the location where a contact quantity is brought into contact by the second contact unit 220, the calculation unit 170 may change the predetermined parameter by increasing the thickness of the base in the direction of the display unit 150 in accordance with the contact quantity for each location indicated by the location information.

The left diagram in FIG. 11B shows a display example when a state in which the surface 101p is switched to the surface 101q with an increasing thickness of the base 101e as a result of an increase in contact quantity of the second contact unit 220 is displayed in the display unit 150. The right diagram in FIG. 11B shows a diagram when the state thereof is viewed from the side.

Figure 11C:
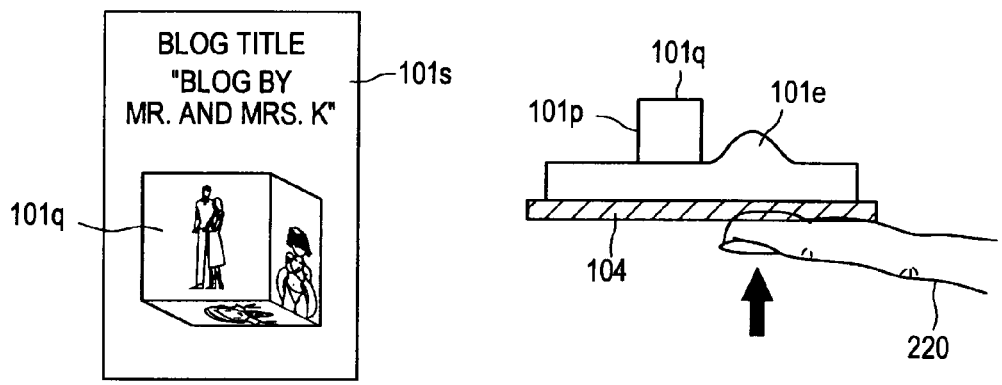

The left diagram in FIG. 11C shows a display example when a state in which the surface 101q is present in the top surface after being switched with an even further increasing thickness of the base 101e as a result of a further increase in contact quantity of the second contact unit 220 is displayed in the display unit 150. The right diagram in FIG. 11C shows a diagram when the state thereof is viewed from the side. In the example shown in FIG. 11C, the processing unit 140 is caused to perform processing (processing to download information of a blog whose blog title is "Blog by Mr. and Mrs. K") in accordance with the surface 101q.

3. Summary

According to the embodiments of the present invention, a ground projecting in a three-dimensional virtual space can be caused to appear in accordance with the shape of a finger coming into contact with a backside touch pad and pressure thereof. Accordingly, the selection state in the depth direction can intuitively be changed by successively moving the front object for objects displayed in the depth direction by being overlapped.

Also, according to the embodiments of the present invention, an intuitive object selection almost as if to scoop up a substance floating on the water with the palm of a hand is enabled by moving objects arranged in a three-dimensional virtual space and overlapped in the depth direction in accordance with a contact area detected by a backside touch pad and pressure detected by a pressure sensor.

A selection operation of various kinds of content such as news articles on the web, photo content at a photo sharing site, search results of web pages, update information of RSS, video content of a video sharing site, and new listening content of a music delivery site, that is, zapping can be performed intuitively with a sense of everlasting interest.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-318574 filed in the Japan Patent Office on Dec. 15, 2008, the entire content of which is hereby incorporated by reference.

What is claimed is:

1. An information processing apparatus, comprising:
    a display unit configured to display an object;
    a storage unit that stores physical quantities inherent in the object and state quantities showing a state of the object;
    a processing unit configured to perform predetermined processing;
    a detection unit that detects a magnitude of pressure received from an operating body or a degree of proximity of the operating body as a contact quantity;
    a calculation unit that calculates, when the state quantities of the object are changed by changing a predetermined parameter specifying a space in which the object is present in accordance with the contact quantity detected by the detection unit, the state quantities of the object after the change based on a dynamic model using the predetermined parameter, the physical quantities of the object stored in the storage unit, and the state quantities of the object stored in the storage unit and updates the state quantities of the object stored in the storage unit with the calculated state quantities of the object after the change; and
    a control unit that controls the display unit to display the object based on the state quantities of the object stored in the storage unit and also controls the processing unit to perform predetermined processing in accordance with the state quantities of the object stored in the storage unit, wherein
    the calculation unit changes the predetermined parameter by increasing a thickness of a base in a direction of the display unit in accordance with the contact quantity detected by the detection unit when the base having a surface constituted by a plane or a curved surface is arranged between the display unit and the detection unit and the object is put on the surface of the base.

2. The information processing apparatus according to claim 1, wherein
    the object is constituted by a plurality of divided objects,
    the storage unit stores a combination of the physical quantities and the state quantities for each divided object,
    the calculation unit calculates, when the state quantities of each of the divided objects are changed by changing the predetermined parameter specifying the space in which the object is present in accordance with the contact quantity detected by the detection unit, the state quantities of each of the divided objects after the change based on the dynamic model using the predetermined parameter, the physical quantities of the divided object stored in the storage unit, and the state quantities of the divided object stored in the storage unit and updates the state quantities of each of the divided objects stored in the storage unit with the calculated state quantities of each of the divided objects after the change, and
    the control unit identifies the divided object the display unit is caused to display from among the plurality of divided objects by determining the state quantities of each of the divided objects stored in the storage unit and causes the processing unit to perform predetermined processing in accordance with the identified divided object.

3. The information processing apparatus according to claim 2, further comprising:
    an input unit, wherein
    the control unit accepts input of selection information to select one of a plurality of the identified divided objects via the input unit when the plurality of the identified divided objects is present and causes the processing unit to perform the predetermined processing in accordance with the divided object selected based on the selection information.

4. The information processing apparatus according to claim 2, wherein
    the detection unit is arranged on a back of the display unit.

5. The information processing apparatus according to claim 4, wherein
the calculation unit changes the predetermined parameter, when the detection unit further detects location information indicating a location where the contact quantity is brought into contact by the operating body, by increasing the thickness of the base in the direction of the display unit in accordance with the contact quantity for each location indicated by the location information.

6. The information processing apparatus according to claim 4, wherein
the physical quantities of each of the divided objects stored in the storage unit include a mass of each of the divided objects and
the state quantities of each of the divided objects stored in the storage unit include position information including a height of each of the divided objects using the surface of the base as a reference.

7. The information processing apparatus according to claim 6, wherein
the calculation unit determines, when the predetermined parameter is changed by increasing the thickness of the base, whether the height indicated by the position information of each of the divided objects remains less than a threshold stored in the storage unit and calculates, for the divided objects whose height is determined to remain less than the threshold, the state quantities of the objects after the change by adding an increase in the thickness of the base to the height included in the position information before the change.

8. The information processing apparatus according to claim 1, wherein
the object is constituted by being surrounded by a plurality of surfaces and
the control unit identifies the surface of the plurality of surfaces on which the display unit is caused to make a display by determining the state quantities of the object stored in the storage unit and causes the processing unit to perform the predetermined processing in accordance with the identified surface.

9. The information processing apparatus according to claim 8, further comprising:
an input unit, wherein
the control unit accepts input of selection information to select one of a plurality of the identified surfaces via the input unit when the plurality of the identified surfaces is present and causes the processing unit to perform the predetermined processing in accordance with the surface selected based on the selection information.

10. The information processing apparatus according to claim 8, wherein
the detection unit is arranged on a back of the display unit.

11. The information processing apparatus according to claim 10, wherein
the calculation unit changes the predetermined parameter, when the detection unit further detects location information indicating a location where the contact quantity is brought into contact by the operating body, by increasing the thickness of the base in the direction of the display unit in accordance with the contact quantity for each location indicated by the location information.

12. The information processing apparatus according to claim 10, wherein
the physical quantities of the object stored in the storage unit include a mass of each of the object and the state quantities of the object stored in the storage unit include position information including a height of the object using the surface of the base as a reference.

13. The information processing apparatus according to claim 1, wherein
the object is constituted by a plurality of divided objects, and
as the contact quantity is increased, ones of the plurality of divided objects placed on the surface of the base are released from a top portion closest to the display unit, in an order arranged from the top portion to the surface of the base.

14. The information processing apparatus according to claim 13, wherein
a previously non-visible one of the plurality of divided objects becomes visible as the ones of the plurality of divided objects are released from the top portion.

15. The information processing apparatus according to claim 1, wherein
the object is constituted by a plurality of divided objects, and
the dynamic model allows respective ones of the plurality of divided objects to fall off from the surface of the base and towards the detection unit as the respective ones of the plurality of divided objects are pushed to be within a predetermined distance from the display unit.

16. The information processing apparatus according to claim 15, wherein
a previously non-visible one of the plurality of divided objects becomes visible as the respective ones of the plurality of divided objects fall off from the surface of the base.

17. An information processing method, comprising the steps of:
detecting a magnitude of pressure received from an operating body or a degree of proximity of the operating body as a contact quantity by a detection unit of an information processing apparatus having a display unit configured to display an object, a storage unit that stores physical quantities inherent in the object and state quantities showing a state of the object, a processing unit configured to perform predetermined processing, the detection unit, a calculation unit, and a control unit;
calculating, when the state quantities of the object are changed by changing a predetermined parameter specifying a space in which the object is present in accordance with the contact quantity detected by the detection unit, the state quantities of the object after the change based on a dynamic model using the predetermined parameter, the physical quantities of the object stored in the storage unit, and the state quantities of the object stored in the storage unit and updating the state quantities of the object stored in the storage unit with the calculated state quantities of the object after the change by the calculation unit; and
controlling the display unit to display the object based on the state quantities of the object stored in the storage unit and also controlling the processing unit to perform predetermined processing in accordance with the state quantities of the object stored in the storage unit by the control unit, wherein
the calculation unit changes the predetermined parameter by increasing a thickness of a base in a direction of the display unit in accordance with the contact quantity detected by the detection unit when the base having a surface constituted by a plane or a curved surface is arranged between the display unit and the detection unit and the object is put on the surface of the base.

18. A program for controlling a computer to function as an information processing apparatus, comprising:
a display unit configured to display an object;
a storage unit that stores physical quantities inherent in the object and state quantities showing a state of the object;
a processing unit configured to perform predetermined processing;
a detection unit that detects a magnitude of pressure received from an operating body or a degree of proximity of the operating body as a contact quantity;
a calculation unit that calculates, when the state quantities of the object are changed by changing a predetermined parameter specifying a space in which the object is present in accordance with the contact quantity detected by the detection unit, the state quantities of the object after the change based on a dynamic model using the predetermined parameter, the physical quantities of the object stored in the storage unit, and the state quantities of the object stored in the storage unit and updates the state quantities of the object stored in the storage unit with the calculated state quantities of the object after the change; and
a control unit that controls the display unit to display the object based on the state quantities of the object stored in the storage unit and also controls the processing unit to perform predetermined processing in accordance with the state quantities of the object stored in the storage unit, wherein
the calculation unit changes the predetermined parameter by increasing a thickness of a base in a direction of the display unit in accordance with the contact quantity detected by the detection unit when the base having a surface constituted by a plane or a curved surface is arranged between the display unit and the detection unit and the object is put on the surface of the base.

* * * * *